(No Model.)

A. BARKER.
PNEUMATIC REGULATING DEVICE.

No. 491,794. Patented Feb. 14, 1893.

Witnesses:
F. Anderson.
C. L. Anderson.

Inventor:
Asbury Barker

UNITED STATES PATENT OFFICE.

ASBURY BARKER, OF PEEKSKILL, NEW YORK.

PNEUMATIC REGULATING DEVICE.

SPECIFICATION forming part of Letters Patent No. 491,794, dated February 14, 1893.

Application filed June 3, 1890. Renewed December 9, 1892. Serial No. 454,583. (No model.)

*To all whom it may concern:*

Be it known that I, ASBURY BARKER, a citizen of the United States, residing at Peekskill, in the county of Westchester, State of New York, have made a new and useful Improvement in Pneumatic Regulating Devices, of which the following is a specification.

My invention relates more particularly to that class of devices in which compressed or inclosed air is used to cushion or retard or check certain mechanical action, that would otherwise be too quick or violent, such as the closing of steam engine valves, the swinging of doors &c.—the more particular application in this case however being the control of camera shutters, doors &c., and consists in means for lessening the friction of the piston or plunger, and for regulating the escape of air.

In all devices of this kind heretofore the results are satisfactory for a little while only, as dust and dirt soon destroy the lubrication or the latter becomes gummed, very much increasing the friction, and permitting undue leakage, and because these quantities are variable and inconstant, no uniformity of action can be maintained.

The object of my invention is to produce a comparatively frictionless yet air tight piston or plunger that shall be absolutely free from any lubricating substance and which the presence of dirt will not affect, and also to provide means for quickly and accurately regulating the air escape which controls the movement of the piston. I accomplish this object by the devices herein described, and particularly pointed out in the claims which follow this specification.

Figure 1:
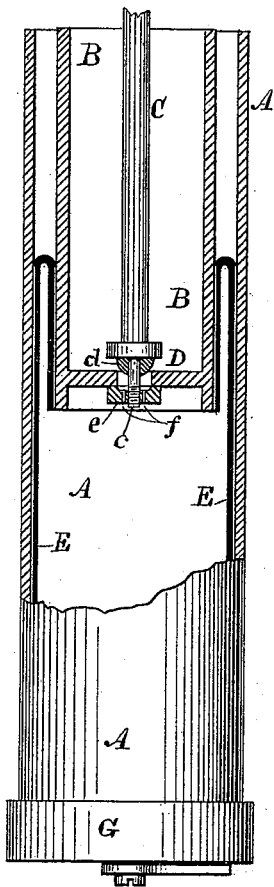
Figure 2:
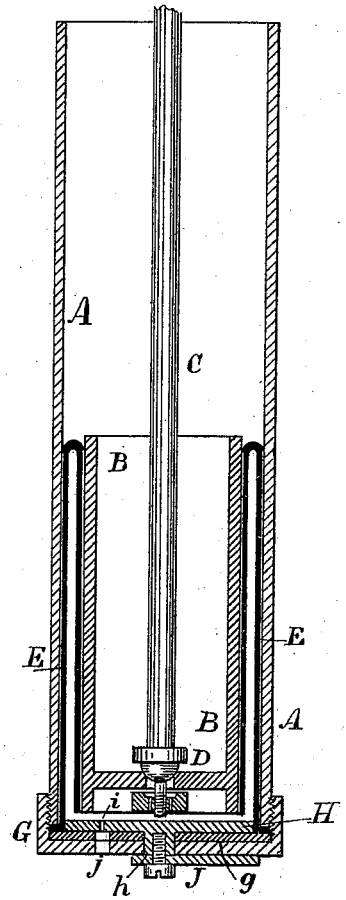
Figure 3:
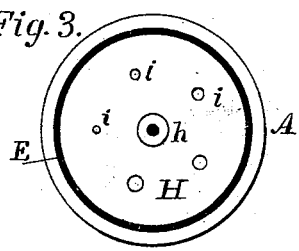
Figure 4:
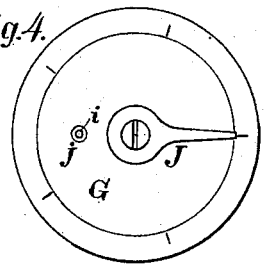

Referring to the drawings in which like letters represent like parts wherever used, Figure 1 represents an elevation, partly sectional, of the devices embodying my improvements. Fig. 2 is a sectional elevation of the same as Fig. 1, showing the parts in a different position. Fig. 3 is a plan of the disk that regulates the escape of air. Fig. 4 is a plan of the lower end of Figs. 1 and 2.

In the drawings A represents the cylinder, provided with heads or caps, only one of which G is shown.

Attached to the rod C is the plunger B the diameter of which is much smaller than that of the cylinder.

E is a tube of rubber or other suitable material, made slightly tapering so that the large end will fit the cylinder and the small end the plunger, inserted in and forming a snug lining to the cylinder; the large end of this tube is securely attached to one end of the cylinder by cement or by clamping as shown in Fig. 2, and the other and smaller end of the tube is folded inward and attached in any suitable way to the lower end of the plunger B.

While I show the tube as fastened to the lower ends of the cylinder and plunger, it is apparent that if the outer part of the tube were fastened to the middle of the cylinder it would answer equally well as in the case shown. The space between the walls of the cylinder and the plunger is equal to a little more than twice the thickness of the flexible tube, so that the plunger can move up and down within the cylinder without any rubbing contact yet the space below it will be air tight. When the plunger is moving down the flexible tube E unrolls from the walls of the cylinder onto the surface of the plunger, and on the upward movement of the plunger the reverse action occurs. The friction is very slight and of the nature of rolling friction, and as no lubrication is required and there is no rubbing of any kind, dirt and dust cannot interfere with its uniform action.

At D is shown the valve for ingress of air during the upward stroke of plunger. The extension $c$ of the rod C passes through the large opening D in the plunger, and carries a nut $e$ capable of adjustment as to amount of play of valve; this nut has openings $f$ through which air enters on upward stroke; a ball $d$ of rubber closes the opening D the moment the rod C begins to force the plunger downward.

The egress of the air is controlled by holes of various sizes in the disk H, which rests on the bottom of the cylinder, though preferably a washer of leather $g$ is interposed to prevent leakage. A stud or boss $h$ on the disk H extends through the cap G, and has attached to it the lever J by which the disk can be rotated.

The circular row of holes $i\ i\ i$ in the disk

H are adapted to be brought, one at a time, into coincidence with the single opening $j$ in the cylinder cap G, which is at least equal to the largest of the holes $i$ $i$. A hole coincident with $j$ is made in the leather washer $g$ also.

The lever J serves not only to turn the disk H but also as an index, in conjunction with the dial formed by marks on the face of the cap G, to show when the desired openings are in position. It may now be understood that during the upward stroke the air freely enters the space below the plunger, but during the downward stroke it can only escape through the opening $i$ $j$, and that as the size of the opening at $j$ can be changed by shifting the pointer J, the speed of the downward stroke of the plunger may be almost instantly adjusted from one rate to another. I do not limit myself however to this particular form of adjustable air escape as there are other obvious ways of attaining it.

It is obvious that my invention as thus described, may be applied to any apparatus where a cushioned, retarded, or regulated movement is required, and the slight amount of friction in the plunger, renders that feature of it one well adapted to many purposes.

Having thus described my invention what I claim and desire to secure by Letters Patent of the United States is:—

1. In a pneumatic regulating device the combination of the cylinder A, plunger B, flexible tube E, valve D and adjustable escape valve H, substantially as described.

2. In a pneumatic regulating device the combination of the cylinder A having opening $j$ in its closed end, a plunger B within said cylinder, a valve D seated in the plunger head, with a valve disk H having a series of various sized openings $i$ adapted to be brought into line with the said opening $j$, substantially as described.

ASBURY BARKER.

Witnesses:
F. ANDERSON,
C. L. ANDERSON.